United States Patent
Burney et al.

(10) Patent No.: US 12,461,840 B2
(45) Date of Patent: Nov. 4, 2025

(54) CROSS-CORRELATION OF LOG PATTERNS ACROSS INFORMATION TECHNOLOGY ASSETS BASED ON LOG TIMELINE GENERATION

(71) Applicant: Dell Products L.P., Round Rock, TX (US)

(72) Inventors: William S. Burney, Apex, NC (US); Raghav Chitta Nagaraj, Holly Springs, NC (US); Peixing Sun, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 35 days.

(21) Appl. No.: 18/443,747

(22) Filed: Feb. 16, 2024

(65) Prior Publication Data
US 2025/0265170 A1    Aug. 21, 2025

(51) Int. Cl.
*G06F 11/34* (2006.01)
*G06F 11/07* (2006.01)
*G06F 11/30* (2006.01)

(52) U.S. Cl.
CPC ...... *G06F 11/3476* (2013.01); *G06F 11/0793* (2013.01); *G06F 11/3072* (2013.01)

(58) Field of Classification Search
CPC ............. G06F 11/3476; G06F 11/0793; G06F 11/3072
USPC ........................................................ 714/1–57
See application file for complete search history.

(56) References Cited

U.S. PATENT DOCUMENTS

| | | | |
|---|---|---|---|
| 8,250,408 B1 * | 8/2012 | Cohen ................... | G06F 11/079 714/48 |
| 8,918,673 B1 * | 12/2014 | Rangaiah .............. | G06F 11/008 714/4.11 |
| 10,528,454 B1 * | 1/2020 | Baraty ................. | G06F 11/3684 |
| 12,189,506 B1 * | 1/2025 | Wang ................. | G06F 11/3082 |
| 2015/0294007 A1 * | 10/2015 | Chen ..................... | G06F 16/288 707/749 |
| 2020/0184355 A1 * | 6/2020 | Mehta ................. | G06F 11/3476 |

(Continued)

OTHER PUBLICATIONS

Sematext Group, "What Is ELK Stack: Tutorial on How to Use It for Log Management," https://sematext.com/guides/elk-stack/#:~:text=Thus%2C ELK is a log,visualize it in real time, Accessed Feb. 1, 2024, 16 pages.

(Continued)

*Primary Examiner* — Sarai E Butler
(74) *Attorney, Agent, or Firm* — Ryan, Mason & Lewis, LLP

(57) ABSTRACT

An apparatus comprises at least one processing device configured to determine a set of one or more log patterns to utilize for scanning a set of logs associated with one or more information technology assets, a given one of the log patterns comprising a mapping between (i) at least a portion of a given raw log entry and (ii) a given descriptive textual label representing content of the given raw log entry. The at least one processing device is also configured to scan the set of logs associated with the one or more information technology assets to identify instances of the determined set of log patterns, to generate a log timeline of the identified instances of the determined set of log patterns, and to utilize the generated log timeline to cross-correlate the identified instances of the determined set of log patterns for the one or more information technology assets.

20 Claims, 13 Drawing Sheets

(56) References Cited

U.S. PATENT DOCUMENTS

2021/0342204 A1\* 11/2021 Choudhury .......... G06F 11/004
2021/0406112 A1\* 12/2021 Moss ................. G06F 11/0751
2023/0051921 A1\* 2/2023 Madala ................ G06N 20/00

OTHER PUBLICATIONS

Solarwinds, "Using Journalctl," https://www.loggly.com/ultimate-guide/using-journalctl/, Accessed Feb. 1, 2024, 9 pages.
R. Gheorghe, "Tutorial: Logging with Journald," https://sematext.com/blog/journald-logging-tutorial/, Apr. 28, 2020, 20 pages.
Dell Technologies, "Dell PowerStore," Data Sheet, H18234, Oct. 2023, 4 pages.
J. Schafer, "Why Journald?" https://www.loggly.com/blog/why-journald/, Jan. 5, 2016, 9 pages.

\* cited by examiner

300
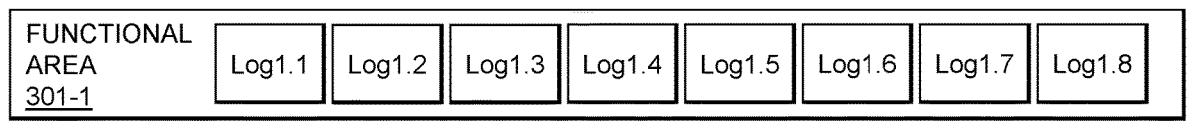
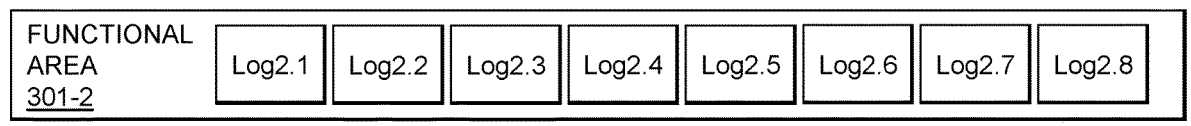
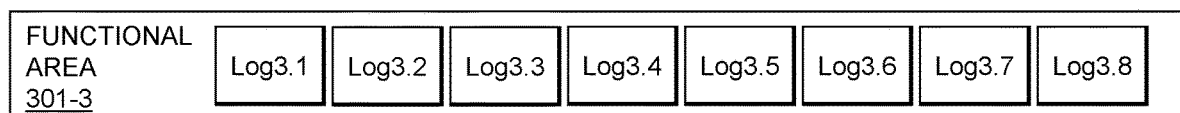
FIG. 3

Tag 1: Pattern 1.1, Pattern 2.1, Pattern 3.1

Tag 2: Pattern 1.3, Pattern 2.4, Pattern 3.5

Tag 3: Pattern 1.5, Pattern 2.6, Pattern 3.5, Pattern 3.6, Pattern 3.7

Tag 4: Pattern 2.7, Pattern 3.7, Pattern 3.8

505

| DATABASE OPERATIONS |
|---|

```
{
    "db_init" : {
        "description" : "Matches log indicating database is initialized.  Regex filters out
                         variables (in this case, the file path) occurring in the log",
        "component" : "db-operation",
        "complex" : true,
        "pattern" : ["database initialized at.*successfully"],
        "label" : "DATABASE_INITIALIZED"
    },
    "db_start" : {
        "description" : "Matches log indicating database started up.  Regex filters out
                         variables (in the case, the IP address) occurring in the log",
        "component" : "db-operation",
        "complex" : true,
        "pattern" : ["database ready at IP.*read-write"],
        "label" : "DATABASE_START"
    },
    "db_stopped" : {
        "description" : "Matches log indicating database stopped",
        "component" : "db-operation",
        "pattern" : ["database stopped"],
        "label" : "DATABASE_STOP"
    }
}
```

CONTROLLER OPERATIONS

```
{
    "controller_start" : {
        "description" : "Matches log indicating database controller started",
        "component" : "controller-operation",
        "pattern" : ["controller started"],
        "label" : "CONTROLLER_START"
    },
    "controller_stop" : {
        "description" : "Matches log indicating controller stopped",
        "component" : "controller-operation",
        "pattern" : ["controller stopped"],
        "label" : "CONTROLLER_STOP"
    }
}
```

FIG. 5C

```
                                    600
                                    ↙
┌─────────────────────────────────────────────────────────────────────────┐
│                          PLANNED FAILOVER                                │
├─────────────────────────────────────────────────────────────────────────┤
│ {                                                                        │
│     "planned_failover" : {                                               │
│         "description" : "This will help construct a timeline associated with a planned failover", │
│         "pattern-ids" : ["planned_reboot_start", "planned_reboot_end", "db_start", │
│                          "db_stopped", "controller_start", "controller_stop", "application_start", │
│                          "appliance_failover"]                           │
│     }                                                                    │
│ }                                                                        │
└─────────────────────────────────────────────────────────────────────────┘

605
                                    ↙
┌─────────────────────────────────────────────────────────────────────────┐
│                         UNPLANNED FAILOVER                               │
├─────────────────────────────────────────────────────────────────────────┤
│ {                                                                        │
│     "unplanned_failover" : {                                             │
│         "description" : "This will help construct a timeline associated with an unplanned │
│                          failover",                                      │
│         "pattern-ids" : ["node_failed", "db_start", "controller_start", "application_start", │
│                          "appliance_failover"]                           │
│     }                                                                    │
│ }                                                                        │
└─────────────────────────────────────────────────────────────────────────┘
```

CROSS-CORRELATION OF LOG PATTERNS ACROSS INFORMATION TECHNOLOGY ASSETS BASED ON LOG TIMELINE GENERATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Support platforms may be utilized to provide various services for sets of managed computing devices. Such services may include, for example, troubleshooting and remediation of issues encountered on computing devices managed by a support platform. This may include periodically collecting information on the state of the managed computing devices, and using such information for troubleshooting and remediation of the issues. Such troubleshooting and remediation may include receiving requests to provide servicing of hardware and software components of computing devices. For example, users of computing devices may submit service requests to a support platform to troubleshoot and remediate issues with hardware and software components of computing devices. Such requests may be for servicing under a warranty or other type of service contract offered by the support platform to users of the computing devices. Support platforms may also provide functionality for testing managed computing devices.

SUMMARY

Illustrative embodiments of the present disclosure provide techniques for cross-correlation of log patterns across information technology assets based on log timeline generation. Such cross-correlation may be used, in some embodiments, for diagnosing issues encountered on the information technology assets, and for performing remediation of the diagnosed issues encountered on the information technology assets.

In one embodiment, an apparatus comprises at least one processing device comprising a processor coupled to a memory. The at least one processing device is configured to determine a set of one or more log patterns to utilize for scanning a set of logs associated with one or more information technology assets, a given one of the one or more log patterns comprising a mapping between (i) at least a portion of a given raw log entry and (ii) a given descriptive textual label representing content of the given raw log entry. The at least one processing device is also configured to scan the set of logs associated with the one or more information technology assets to identify instances of the determined set of one or more log patterns, to generate a log timeline of the identified instances of the determined set of one or more log patterns, and to utilize the generated log timeline to cross-correlate the identified instances of the determined set of one or more log patterns for the one or more information technology assets.

These and other illustrative embodiments include, without limitation, methods, apparatus, networks, systems and processor-readable storage media.

BRIEF DESCRIPTION OF THE DRAWINGS

FIG. 3 shows functional areas of a software stack of an information technology asset in an illustrative embodiment.

FIGS. 5A-5C show examples of log pattern specifications in an illustrative embodiment.

FIG. 6 shows examples of log pattern tags in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
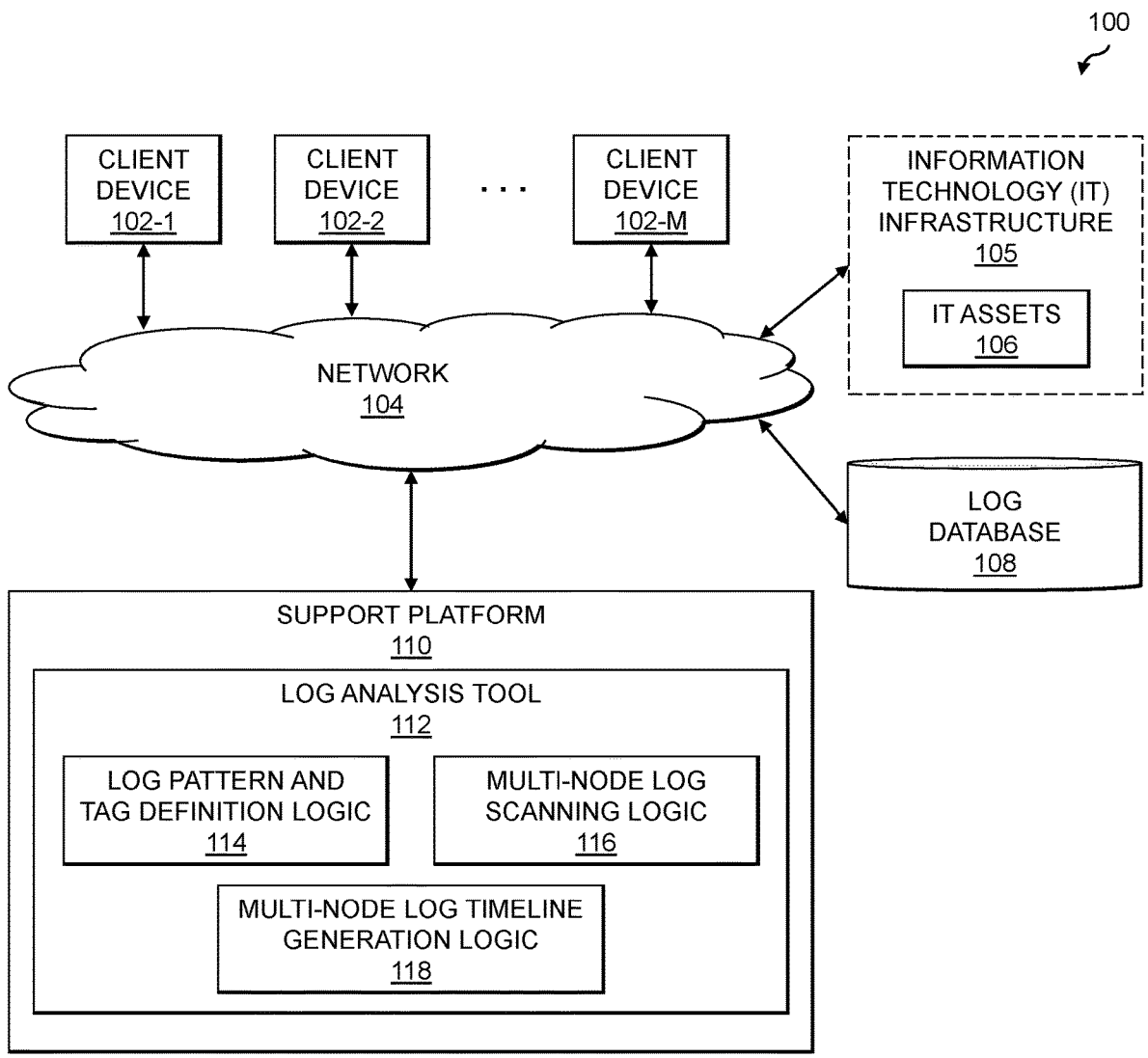
FIG. 1 is a block diagram of an information processing system configured for cross-correlation of log patterns across information technology assets based on log timeline generation in an illustrative embodiment.

FIG. 1 shows an information processing system 100 configured in accordance with an illustrative embodiment. The information processing system 100 is assumed to be built on at least one processing platform and provides functionality for cross-correlation of log patterns across information technology (IT) assets based on log timeline generation. The information processing system 100 includes a set of client devices 102-1, 102-2, . . . 102-M (collectively, client devices 102) which are coupled to a network 104. Also coupled to the network 104 is an information technology (IT) infrastructure 105 comprising one or more IT assets 106, a log database 108, and a support platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. The IT assets 106 are examples of "nodes" which may be clustered or have another relationship between them (e.g., a replication relationship), such that it is useful to analyze logs across multiple nodes for analyzing one or more issues encountered on the IT assets 106 of the IT infrastructure 105.

In some embodiments, the support platform 110 is used for an enterprise system. For example, an enterprise may subscribe to or otherwise utilize the support platform 110 for managing IT assets 106 of the IT infrastructure 105 operated by that enterprise. Users of the enterprise associated with different ones of the client devices 102 may utilize the support platform 110 in order to manage problems or other issues which are encountered on different ones of the IT assets 106. As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The log database 108 is configured to store and record various information that is utilized by the support platform 110. Such information may include, for example, logs which are associated with different ones of the IT assets 106 (e.g., logs from different "nodes"), where such logs are processed in the support platform 110 utilizing a log analysis tool 112 as described in further detail below. The log database 108 may also store configuration information for the log analysis tool 112, where the configuration information may include definitions or other specifications of log patterns, log pattern tags, etc. The log database 108 may be implemented utilizing one or more storage systems. The term "storage system" as used herein is intended to be broadly construed. A given storage system, as the term is broadly used herein, can comprise, for example, content addressable storage, flash-based storage, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the support platform 110, as well as to support communication between the support platform 110 and other related systems and devices not explicitly shown.

The support platform 110 may be provided as a cloud service that is accessible by one or more of the client devices 102 to allow users thereof to manage servicing of the IT assets 106 of the IT infrastructure 105, the client devices 102 themselves, other products which are serviced by the support platform 110, etc. The client devices 102 may be configured to access or otherwise utilize the support platform 110 to track and manage reverse logistics processing for different ones of the IT assets 106 (or other products, such as the client devices 102 themselves). In some embodiments, the client devices 102 are assumed to be associated with system administrators, IT managers, support engineers or other authorized personnel responsible for managing or performing servicing of the IT assets 106. In some embodiments, the IT assets 106 of the IT infrastructure 105 are owned or operated by the same enterprise that operates the support platform 110. In other embodiments, the IT assets 106 of the IT infrastructure 105 may be owned or operated by one or more enterprises different than the enterprise which operates the support platform 110 (e.g., a first enterprise provides support for multiple different customers, business, etc.). Various other examples are possible.

In some embodiments, the client devices 102 and/or the IT assets 106 of the IT infrastructure 105 may implement host agents that are configured for automated transmission of information with the support platform 110. It should be noted that a "host agent" as this term is generally used herein may comprise an automated entity, such as a software entity running on a processing device. Accordingly, a host agent need not be a human entity.

The support platform 110 in the FIG. 1 embodiment is assumed to be implemented using at least one processing device. Each such processing device generally comprises at least one processor and an associated memory, and implements one or more functional modules or logic for controlling certain features of the support platform 110. In the FIG. 1 embodiment, the support platform 110 implements the log analysis tool 112. The log analysis tool 112 comprises log pattern and tag definition logic 114, multi-node log scanning logic 116, and multi-node log timeline generation logic 118. The log pattern and tag definition logic 114 is configured to determine a set of log patterns (e.g., which may be determined through parsing tags, which are collections of log patterns relating to a specific type of operation of an IT software stack running on the IT assets 106) to utilize for scanning logs (e.g., from log database 108) associated with the IT assets 106. The log patterns may comprise mappings between portions of raw log entries and descriptive textual labels which represent the content of raw log entries. The multi-node log scanning logic 116 is configured to scan the set of logs associated with the IT assets 106 to identify instances of the determined set of log patterns. The multi-node log timeline generation logic 118 is configured to generate a log timeline of the identified instances of the determined set of log patterns, and to utilize the generated log timeline to cross-correlate the identified instances of the determined set of log patterns for one or more of the IT assets 106. The log analysis tool 112 is configured to utilize the cross-correlated instances of the determined set of log patterns to diagnose at least one issue encountered on at least one of the IT assets 106, and to perform remediations of the diagnosed at least one issue.

At least portions of the log analysis tool 112, the log pattern and tag definition logic 114, the multi-node log scanning logic 116, and the multi-node log timeline generation logic 118 may be implemented at least in part in the form of software that is stored in memory and executed by a processor.

It is to be appreciated that the particular arrangement of the client devices 102, the IT infrastructure 105, the log database 108 and the support platform 110 illustrated in the FIG. 1 embodiment is presented by way of example only, and alternative arrangements can be used in other embodiments. As discussed above, for example, the support platform 110 (or portions of components thereof, such as one or more of the log analysis tool 112, the log pattern and tag definition logic 114, the multi-node log scanning logic 116, and the multi-node log timeline generation logic 118) may in some embodiments be implemented internal to one or more of the client devices 102 and/or the IT infrastructure 105.

The support platform 110 and other portions of the information processing system 100, as will be described in further detail below, may be part of cloud infrastructure.

The support platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the log database 108 and the support platform 110 or components thereof (e.g., the log analysis tool 112, the log pattern and tag definition logic 114, the multi-node log scanning logic 116, and the multi-node log timeline generation logic 118) may be implemented on respective distinct processing platforms, although numerous other arrangements are possible. For example, in some embodiments at least portions of the support platform 110 and one or more of the client devices 102, the IT infrastructure 105, the IT assets 106 and/or the log database 108 are implemented on the same processing platform. A given client device (e.g., 102-1) can therefore be implemented at least in part within at least one processing platform that implements at least a portion of the support platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the log database 108 and the support platform 110, or portions or components thereof, to reside in different data centers. Numerous other distributed implementations are possible. The support platform 110 can also be implemented in a distributed manner across multiple data centers.

Additional examples of processing platforms utilized to implement the support platform 110 and other components of the information processing system 100 in illustrative embodiments will be described in more detail below in conjunction with FIGS. 10 and 11.

It is to be understood that the particular set of elements shown in FIG. 1 for cross-correlation of log patterns across IT assets based on log timeline generation is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for cross-correlation of log patterns across IT assets based on log timeline generation will now be described in more detail with reference to the flow diagram of FIG. 2. It is to be understood that this particular process is only an example, and that additional or alternative processes for cross-correlation of log patterns across IT assets based on log timeline generation may be used in other embodiments.

In this embodiment, the process includes steps 200 through 210. These steps are assumed to be performed by the support platform 110 utilizing the log analysis tool 112, the log pattern and tag definition logic 114, the multi-node log scanning logic 116, and the multi-node log timeline generation logic 118. The process begins with step 200, determining a set of one or more log patterns to utilize for scanning a set of logs associated with one or more IT assets. The one or more IT assets may be part of a cluster of IT assets. The one or more IT assets may comprise a first IT asset having a defined relationship (e.g., a replication relationship) with a second IT asset.

A given one of the one or more log patterns comprises a mapping between (i) at least a portion of a given raw log entry and (ii) a given descriptive textual label representing content of the given raw log entry. The given log pattern may utilize regular expression matching for mapping (i) the at least a portion of the given raw log entry to (ii) the given descriptive textual label representing the content of the given raw log entry.

In some embodiments, the set of one or more log patterns may be determined by parsing one or more tags, a given one of the one or more tags comprising at least two log patterns associated with a given event type. The at least two log patterns in the given tag may comprise at least a first log pattern in a first functional area of an IT software stack running on the one or more IT assets and at least a second log pattern in a second functional area of the IT software stack running on the one or more IT assets, the second functional area being different than the first functional area.

In some embodiments, the set of one or more log patterns may be determined by parsing two or more log pattern configuration files, where the two or more log pattern configuration files are associated with different functional areas of an IT software stack running on the one or more IT assets.

In some embodiments, the set of one or more log patterns are determined by parsing two or more tag configuration files, where the two or more tag configuration files are associated with two or more different types of operations of an IT software stack running on the one or more IT assets. A given one of the two or more different types of operations may comprise a first set of one or more log patterns from a first functional area of the IT software stack running on the one or more IT assets and a second set of one or more log patterns from a second functional area of the IT software stack running on the one or more IT assets.

Figure 2:
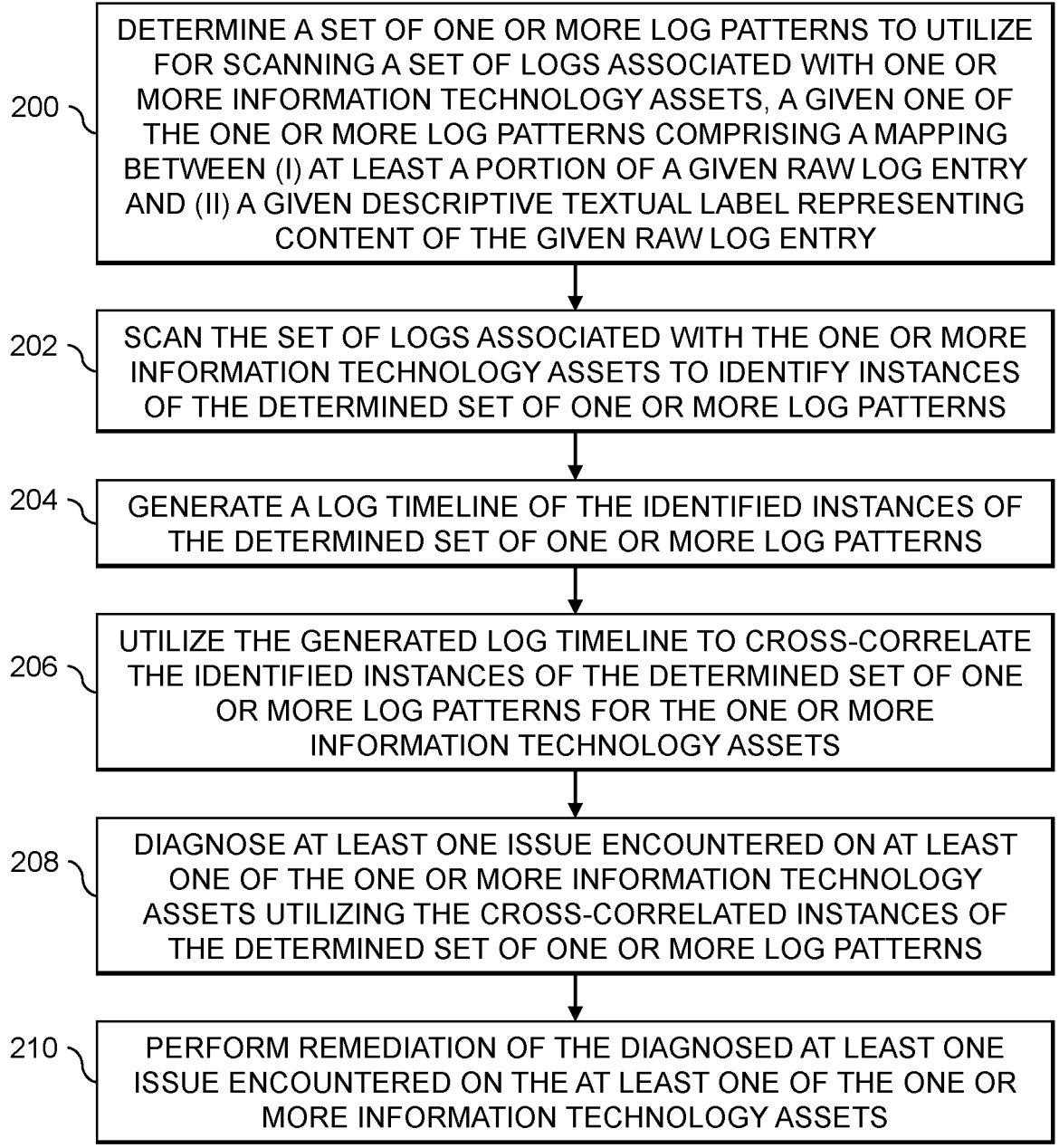
FIG. 2 is a flow diagram of an exemplary process for cross-correlation of log patterns across information technology assets based on log timeline generation in an illustrative embodiment.

The FIG. 2 process continues with step 202, scanning the set of logs associated with the one or more IT assets to identify instances of the determined set of one or more log patterns. In step 204, a log timeline of the identified instances of the determined set of one or more log patterns is generated. The generated log timeline may consolidate events occurring on two or more IT assets into a single visualization. The generated log timeline may utilize a tabular format with tabs corresponding to the two or more IT assets and entries for different times having descriptive textual labels representing the content of raw log entries for events occurring on respective ones of the two or more IT assets at the different times.

The generated log timeline is utilized in step 206 to cross-correlate the identified instances of the determined set of one or more log patterns for the one or more IT assets. In step 208, at least one issue encountered on at least one of the one or more IT assets is diagnosed utilizing the cross-correlated instances of the determined set of one or more log patterns. In step 210, remediation of the diagnosed at least one issue encountered on the at least one of the one or more IT assets is performed.

The particular processing operations and other system functionality described in conjunction with the flow diagram of FIG. 2 are presented by way of illustrative example only, and should not be construed as limiting the scope of the disclosure in any way. Alternative embodiments can use other types of processing operations. For example, as indicated above, the ordering of the process steps may be varied in other embodiments, or certain steps may be performed at least in part concurrently with one another rather than serially. Also, one or more of the process steps may be repeated periodically, or multiple instances of the process can be performed in parallel with one another for different sets of logs, for different tags or other sets of log patterns, etc.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments provide technical solutions for implementing log analysis tools, where the log analysis tools are extensible and provide functionality for generating multi-node log timelines. In some embodiments, the multi-node log timelines are generated for logs that are stored in a Journald system service for collecting and storing log data. The log analysis tools described herein provide various technical advantages, improving the ability of developers or other users, tools or systems to quickly triage and diagnose problems and determine the appropriate root cause of issues.

Finding the root cause of problems in large and complex systems with several layers or areas of functionality and expertise throughout an IT product can be very difficult. At times, problems arise that impact several different areas of functionality (e.g., of one or more IT assets), which requires someone to be familiar with all of the different impacted areas of functionality in order to determine the root cause of the problem. This makes it difficult for new people, or people only familiar with one or a few areas of functionality, to figure out the root causes of issues. Given the number of people with the total requisite knowledge may be very limited, this can impede proper diagnosis of issues and subsequent delivery or implementation of appropriate solutions.

Most of the time, in large embedded systems, the log journal is the starting point for anyone trying to triage or root cause issues. The journal will have logs pertaining to an issue, but the overwhelming majority of the logs in the journal will be for unrelated activity which is most likely a distraction to the true root cause. As such, while the journal may represent the best place to start, it can become overwhelming for a user due to the amount of information being conveyed. Further, some journal entries may be specific to a functional area that generated the journal entry. The underlying importance of the information in the journal could easily be misconstrued by someone not familiar with the functional area that generated the journal entry and, in turn, could cause someone to come to the wrong conclusions.

For systems which have interactions across multiple node instances (e.g., nodes in a cluster, nodes which are related to one another such as nodes having a replication relationship, etc.), this is further complicated by trying to coordinate actions or events on one node with actions or events that occur on other nodes. To find the few journal entries that pertain to the issue at hand, a user may need to filter through thousands if not hundreds of thousands of journal entries across multiple journal instances for different nodes.

The log analysis tools described herein can advantageously improve the ability to root cause issues by filtering out a majority of the details from a journal or other collection logs which are not related to the overall operation (e.g., or some defined type of operation) of a product or system. In some embodiments, a log analysis tool is configured to determine a functional timeline of activity across all of the areas of functionality, and to highlight important decision points. In addition, the log analysis tool may be configured to present a common timeline of activity across multiple nodes, which enables diagnosis of problems through correlation of activities on one node with activities on other nodes that occur at the same time or close in time to one another.

In some embodiments, a log analysis tool utilizes information related to the log entries which are considered important for different functional areas of a particular IT product, where the important log entries may be defined by developers from the different functional areas. Each functional area would have defined patterns, which identify log entries that are important to their functional area. The patterns will also have a descriptive label, which includes a clear and concise piece of text that describes what the log entry represents. The descriptive label is used to replace the journal output, to convey the meaning of the journal in a way that developers or other users outside a given functional area are able to understand what the logs from the given functional area represent. The log analysis tool may aggregate the patterns and use them to create an output with journal entries that actually match one of the patterns. By then replacing the journal data with the descriptive labels provided by the teams that defined the patterns, the specific meaning of obscure logs can be made clear.

Log patterns may be grouped to aggregate patterns that make up a vertical slice of functionality within a silo or across the entire platform. This allows a developer or other user to cast a wide net initially, and then if the output is still too dense, the developer or other user can supply a smaller subset or group of patterns and/or tags to focus on a specific slice of functionality. FIG. 3 shows a software stack 300 of an IT product, which includes three different functional areas 301-1, 301-2 and 301-3 (collectively, functional areas 301). Each of the functional areas 301 is associated with different log entries. For example, functional area 301-1 is associated with journal entries Log1.1, Log1.2, Log1.3, Log1.4, Log1.5, Log1.6, Log1.7 and Log1.8, while functional area 301-2 is associated with journal entries Log 2.1, Log2.2, Log2.3, Log2.4, Log2.5, Log2.6, Log2.7 and Log2.8, and functional area 301-3 is associated with journal entries Log3.1, Log3.2, Log3.3, Log3.4, Log3.5, Log3.6, Log3.7 and Log3.8. It should be appreciated that the particular number of functional areas and their associated journal entries shown in FIG. 3 is presented by way of example only. A software stack may include more or fewer than three functional areas, and each functional area may include any number of journal entries. Further, different functional areas may include different numbers of journal entries.

Any given operation can impact just one or many different functional areas. Each functional area will define journal entries that convey information relevant to their functional area, but there are most likely more logs defined that do not relate to a specific operation in each functional area versus the specific logs that do relate to a specific operation. Thus, even filtering by functional area (e.g., using the tag option on the journalctl utility) doesn't always help because not all of the journal entries for a functional area may be relevant for a specific operation of interest. If journal entries from more than one functional area are needed in order to capture the entire problem space, the user may be inundated with too much information.

Figure 4:
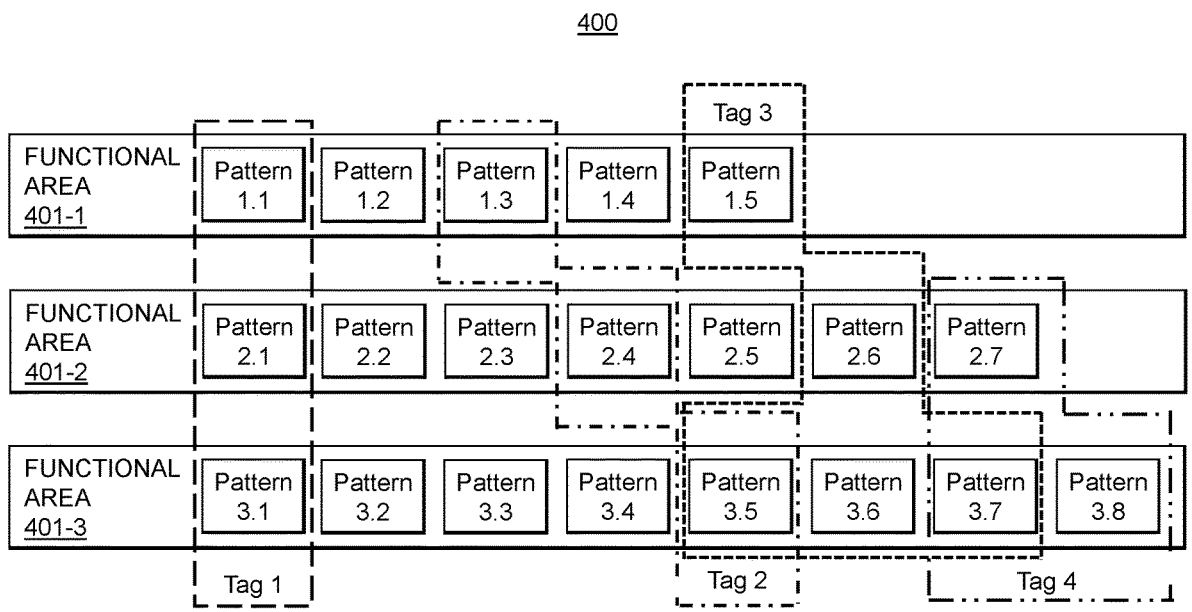
FIG. 4 shows tags of log patterns across functional areas of a software stack of an information technology asset in an illustrative embodiment.

The log analysis tools described herein are configured to identify specific journal entries which are more relevant for scenarios that cross functional boundaries (e.g., an operation that a user performs on an IT product which trickles down through the IT product's functional stack). FIG. 4 shows a functional stack 400 for an IT product, in which patterns across different functional areas 401-1, 401-2 and 401-3 (collectively, functional areas 401) are tagged. The functional area 401-1 includes Pattern 1.1, Pattern 1.2, Pattern 1.3, Pattern 1.4 and Pattern 1.5, while the functional area 401-2 includes Pattern 2.1, Pattern 2.2, Pattern 2.3, Pattern 2.4, Pattern 2.5, Pattern 2.6 and Pattern 2.7, and the functional area 401-3 includes Pattern 3.1, Pattern 3.2, Pattern 3.3, Pattern 3.4, Pattern 3.5, Pattern 3.6, Pattern 3.7 and Pattern 3.8. In the example of FIG. 4, four tags are defined. Tag 1 includes Pattern 1.1, Pattern 2.1 and Pattern 3.1. Tag 2 includes Pattern 1.3, Pattern 2.4 and Pattern 3.5. Tag 3 includes Pattern 1.5, Pattern 2.6, Pattern 3.5, Pattern 3.6 and Pattern 3.7. Tag 4 includes Pattern 2.7, Pattern 3.7 and Pattern 3.8. It should be appreciated that the particular number of functional areas and their associated patterns shown in FIG. 4 is presented by way of example only. A software stack may include more or fewer than three functional areas, and each functional area may include any number of patterns, with different functional areas possibly having different numbers of patterns. Further, the particular number of tags may vary as needed or desired.

Each functional area can choose which logs they create patterns to represent, and then specific patterns related to a specific cross-functional operation can be grouped together via tags. Cross-functional operations are closely related to externally visible behaviors. Thus, when a user is trying to triage some issue, the user can choose the tag (or tags) which are representative of the cross-functional operation related to the issue being triaged to thus filter out a lot of unnecessary information. If a journal entry itself contains information that needs to be conveyed other than time and the concise replacement text which is defined (e.g., the descriptive label), developers can also define sub-patterns to match data within the journal entry to be extracted and included in the concise replacement text in order to convey information that may help to determine if a flow of journal entries was problematic or normal.

The log analysis tools described herein advantageously allow simultaneous scans across the journals for multiple nodes which are involved in a given problem space. Patterns are matched against each of the journals, and then a log analysis tool can coalesce the data across the multiple nodes and generate a multi-node log timeline (e.g., specific to one or more patterns or tags of interest for an issue or issues being triaged). The multi-node log timeline may present data in a columnar format, aligning the timestamp for different journal matches across different nodes in a single row of output. This makes it easier to correlate activity on one node with like activity on a different node. The unique combination of detail of definition, flexibility of search, filtering to specific functionality, and coalescing of cross-node activity based on time that makes the log analysis tools described herein so powerful. The log analysis tools described herein thus allow users to cast a wide net, and then bore down quickly to a specific vertical or horizontal slice to determine which functional areas and which general point in time has the relevant journal entries that capture the root cause of a problem.

In some embodiments, a log analysis tool is configured to receive various inputs, including journal or other log files (e.g., Journald log files) from a cluster of nodes, along with configuration (config) files with log/regular expression (regex) to interpretable text mappings. There may be a combination of multiple types of configuration files, including pattern configuration files and tag configuration files. The pattern configuration files include actual log/regex to interpretable text mappings that match up against raw logs. The tag configuration files include tags which are defined to contain subsets of patterns for specific issues (e.g., networking, failover, etc.). The log analysis tool may also receive as an input one or more user-selectable options for filtering the output based on issues (e.g., networking, failover, etc.).

Figure 5A:

The log analysis tool will match raw logs with defined patterns from the pattern configuration files. The pattern configuration files may be created for each functional area. FIGS. 5A-5C show pattern configuration files which are created for different functional areas. FIG. 5A shows a failover configuration file 500, which may be saved as a JavaScript Object Notation (JSON) file such as "failover.json" where there might be one or more components associated with certain special logs (e.g., "—Reboot-" for the "node_failed" pattern). FIG. 5B shows a database operations configuration file 505, which may be saved as a JSON file such as "db_operations.json") where there might be one or more components associated with special logs which use regex matching (e.g., in the "db_init" and "db_start" patterns). FIG. 5C shows a controller operations configuration file 510, which may be saved as a JSON file such as "controller_operations.json".

The log analysis tool then filters logs from each of a set of one or more nodes (e.g., nodes that are part of a cluster or have some other relationship with one another, such as a replication relationship) based on the tags that are input in a specific request. Some IT products, such as Dell PowerStore, utilize the journalctl utility which comes with features such as using tags to filter specific component logs in the interest of performance and reducing clutter. The patterns (e.g., as shown in FIGS. 5A-5C) are defined such that they can serve or be used as tags to journalctl or another suitable tool or utility. FIG. 6 shows two tag configuration files 600 and 605. The tag configuration file 600 is for a planned failover and may be saved as a JSON file such as "planned_failover_tags.json" while the tag configuration file 605 is for an unplanned failover and may be saved as a JSON file such as "unplanned_failover_tags.json". Each of the tag configuration files 600 and 605 includes pattern identifiers (pattern-ids) that match up with the defined patterns shown in the pattern configuration files of FIGS. 5A-5C. The log analysis tool is then configured to output interpretable text, which may be in a tabular format across all the nodes in the cluster.

Figure 7:
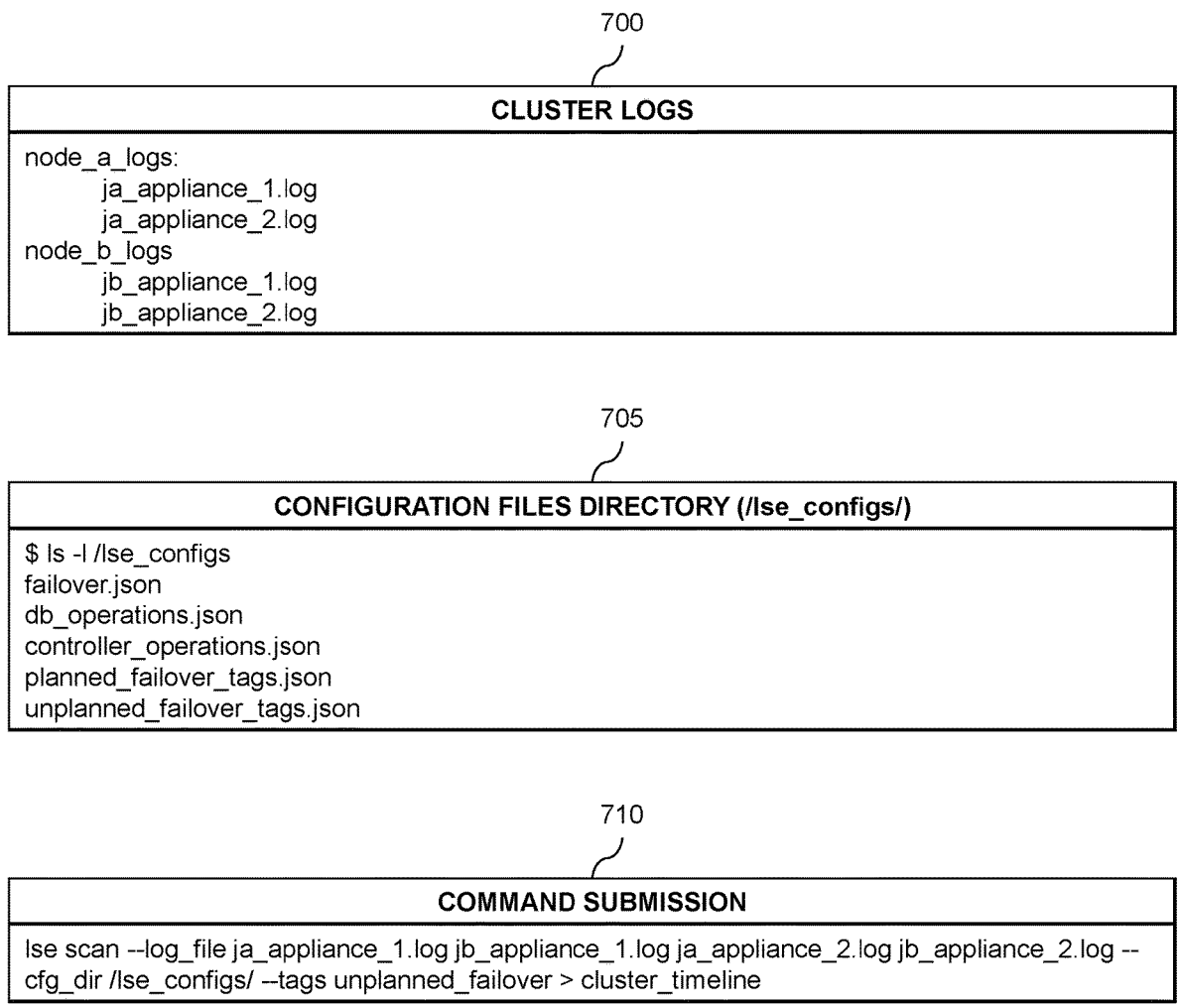
FIG. 7 shows pseudocode for configuration and command submission to a log analysis tool in an illustrative embodiment.
Figure 8:
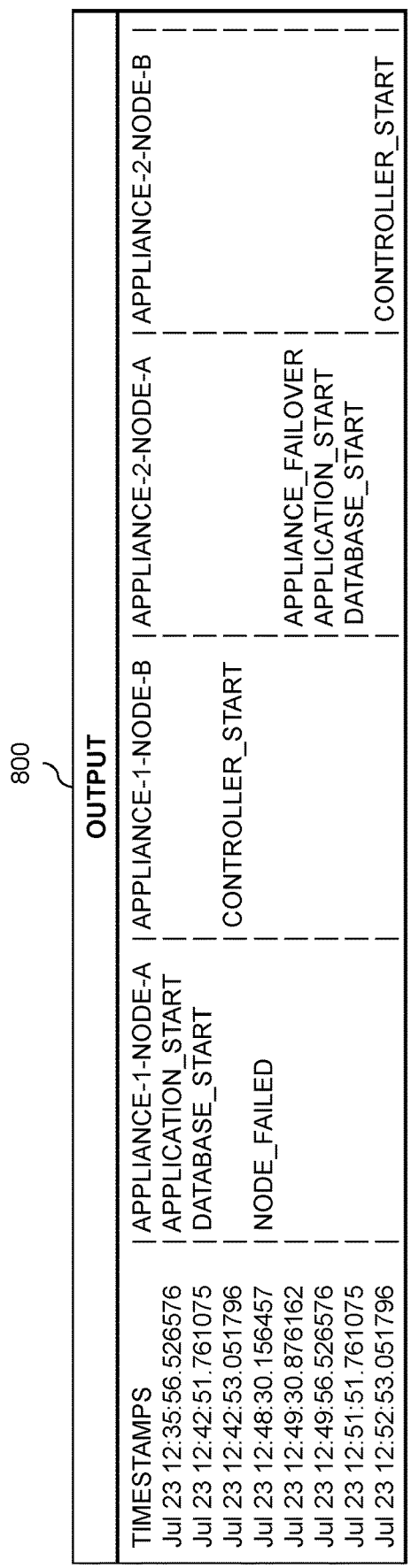
FIG. 8 shows a multi-node log timeline output of a log analysis tool in an illustrative embodiment.

An example will now be described with respect to FIGS. 7 and 8, where in this example there are two appliances (Appliance-1 and Appliance-2) which are part of a cluster, and where each of the appliances includes two nodes (Appliance-1-Node-A, Appliance-1-Node-B, Appliance-2-Node-A and Appliance-2-Node-B). The log analysis tool is used to generate or construct a timeline of events across each of the nodes of the two appliances. As shown in FIG. 7, a set of cluster logs 700 includes "node_a_logs" and "node_b_logs" for each of the two appliances (e.g., ja_appliance_1.log, ja_appliance_2.log, jb_appliance_1.log, and jb_appliance_2.log). In this example, it is assumed that the configuration files used by the log analysis tool are in a shareable directory (e.g., /lse_configs/). FIG. 7 shows a command for listing the configuration files in the configuration files directory 705, which includes the various configuration files described above with respect to FIGS. 5A-5C (e.g., failover.json, db_operations.json and controller_operations.json) and FIG. 6 (e.g., planned_failover_tags.json and unplanned_failover_tags.json). FIG. 7 further shows a command submission 710 that is used to invoke the log analysis tool, where here "lse" is the command name for the log analysis tool. In this example, the "—log_file" option enables providing all required log files (e.g., ja_appliance_1.log, jb_appliance_1.log, ja_appliance_2.log and jb_appliance_2.log). The "—cfg_dir" option enables providing the directory location of the pattern and tag configuration files (e.g., /lse_configs/). The "—tags" option enables specification of the tags to be matched, which in this case is the "unplanned_failover" tag defined in the configuration file directory. It should be noted that "unplanned_failover" tag could be replaced with a different specific tag (e.g., "planned_failover"), two or more tags may be specified, or all tags may be specified (e.g., using "—all_tags") as desired. The output is redirected to a file "cluster_timeline". FIG. 8 shows an example output 800, showing an unplanned node failure event causing appliance failover (e.g., from Appliance-1 to Appliance-2).

The technical solutions described herein enable log analysis tools to provide output in an interpretable manner, such as an output including a timeline of events that occurred across multiple nodes in a single view. This is in contrast with conventional approaches, which require manual investigation and construction of a timeline of events from raw logs of multiple nodes sequentially. Consider, for example, a Dell PowerStore cluster which includes four appliances, with each of the four appliances having two nodes. The log analysis tools described herein can process the eight raw logs files in this case automatically (e.g., while a user can focus on other activity). In addition, the output of interpretable text provided by the log analysis tools described herein allows users with only a high-level system knowledge to triage issues without involving development teams with expertise in different functional areas, thus freeing up the development teams to work on other tasks.

Figure 9:
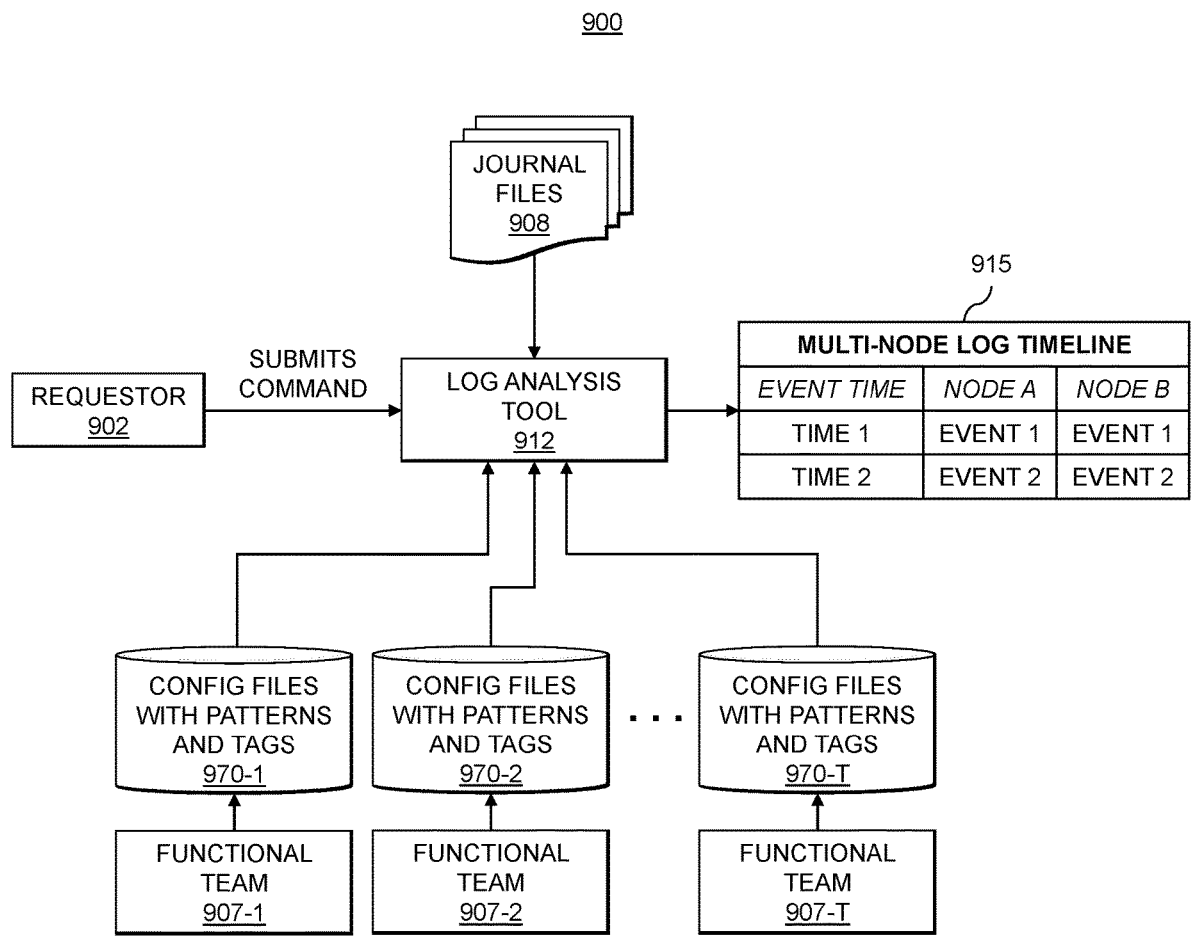
FIG. 9 shows a system flow for operating a log analysis tool in an illustrative embodiment.

FIG. 9 shows a system 900 for implementing a log analysis tool 912, which is configured to receive commands submitted by a requestor 902, where the commands are requests to produce timelines of events across multiple nodes (e.g., where the commands may include tags specifying the types of activity to look for). The log analysis tool 912 obtains journal files 908 to analyze, as well as configuration files 970-1, 970-2, . . . 970-T (collectively, configuration files 970) which are maintained by different functional teams 907-1, 907-2, . . . 907-T (collectively, functional teams 907), where the configuration files 970 include different patterns and tags associated with different functional areas of an IT product of interest. The output 915 is a multi-node log timeline, showing event times and events occurring across different nodes (e.g., multiple nodes of a cluster, or other nodes having some relationship with one another).

In some embodiments, the log analysis tool 912 includes logic implemented as one or more Python scripts. Advantageously, design decisions may be selected for amplifying the power of the log analysis tool 912. Such design decisions include using a flexible file format for the pattern and tag configuration files. In some embodiments, JSON is used to make such files self-documenting. Fields are added to the configuration files that describe the purpose of each pattern and tag. The functional teams 907 can thus maintain their own patterns and tags, and the log analysis tool 912 is configured to combine all the patterns and tags from the configuration files 970 from the different functional areas into a central namespace where they can be searched, grouped and used. Thus, the log analysis tool 912 is designed to identify scenarios where more than one pattern results in the same match. This allows the functional teams 907 to then reconcile duplicate patterns without requiring everything to be maintained as a single monolith. Further, all of the pattern matching for journal entries in the journal files 908 is driven by providing a combination of journal tags and regular expressions. Any replacement text derived from the journal entries is also driven via regular expressions. Regular expressions are extremely flexible and can be well-documented.

In the system 900, the requestor 902 submits a command with inputs, such as the location of the configuration files 970 maintained by each of the functional teams 907. The locations of the configuration files 970 are provided so that the log analysis tool 912 can consolidate all the patterns and tags to make them available for use. The command submitted by the requestor 902 also includes a list of tags and patterns to use during the scan of the journal files 908. The log analysis tool 912 determines a list of all patterns to match by recursively expanding tags to produce a single consolidated list of patterns to match. The log analysis tool 912 then produces the multi-node log timeline output 915.

The technical solutions advantageously enable processing to map raw logs (e.g., Journald logs) into interpretable text by using a set of configuration files (e.g., pattern and tag configuration files in JSON format). The technical solutions also enable interleaving an arbitrary number of logs, generated from separate sources during the same time period, into a single output stream.

Conventional approaches typically focus on simple filtering in order to identify and highlight relevant logs for analysis. Such approaches, however, are flawed because they depend heavily on users knowing the relevance and importance of every log that remains after filtering. Further, simple filtering does not allow for visually correlating like events across multiple nodes. Simply coalescing all the matches into a sorted order suffers from the same problems, namely, that by coalescing all the data together you obfuscate the most likely causes of cross-node issues. Some other conventional approaches utilize an ELK logging approach (e.g., using an Elastic stack including logstash, elasticsearch and kibana tools) which requires heavy computing resources to sort through and index all relevant log files so that complex searches can be run in a reasonable amount of time. Though solutions like ELK can provide some advantages relative to simple filtering approaches, ELK approaches are not able to correlate data over log files from multiple nodes. The technical solutions described herein, in contrast, do not require use of heavy computing resources to pre-process data. Instead, the technical solutions described herein can scan, sort and report using any computing resources that are able to simply unpack or uncompress a journal or other log file. Further, the technical solutions described herein can be specifically tailored for triaging log files in multi-node environments in order to provide cross-node correlation out of the box.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for cross-correlation of log patterns across IT assets based on log timeline generation will now be described in greater detail with reference to FIGS. 10 and 11. Although described in the context of system 100, these platforms may also be used to implement at least portions of other information processing systems in other embodiments.

Figure 10:
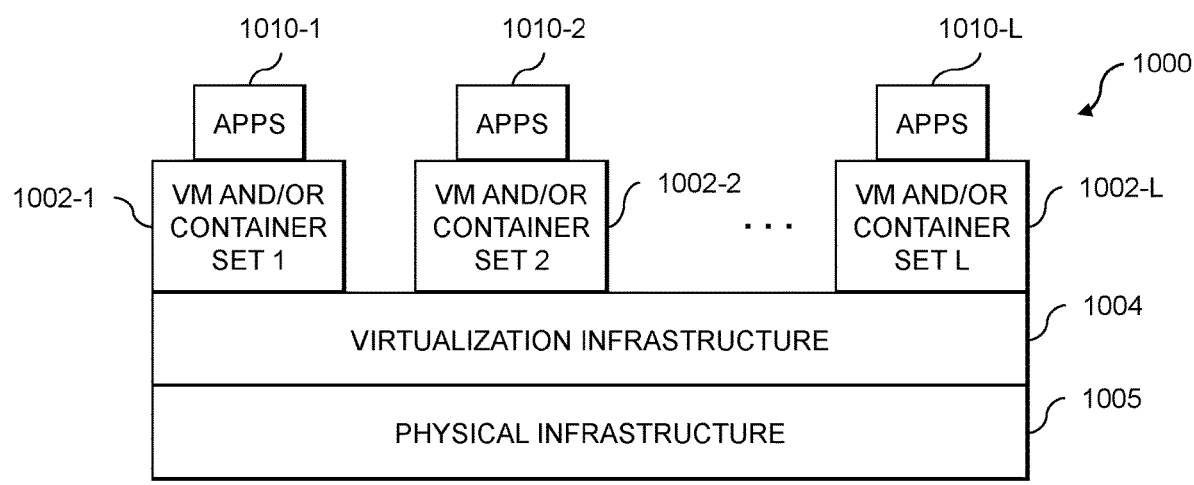
FIGS. 10 and 11 show examples of processing platforms that may be utilized to implement at least a portion of an information processing system in illustrative embodiments.
Figure 11:
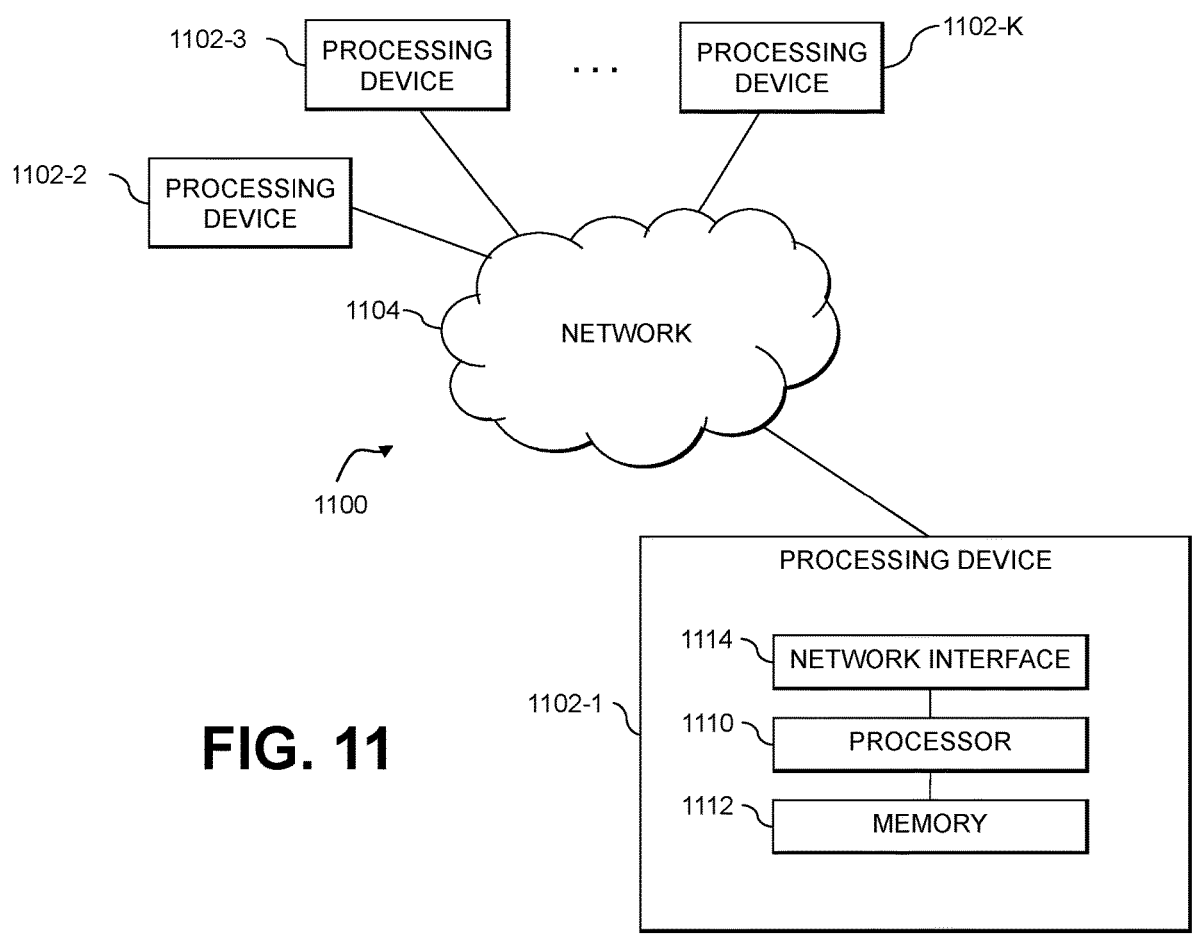

FIG. 10 shows an example processing platform comprising cloud infrastructure 1000. The cloud infrastructure 1000 comprises a combination of physical and virtual processing resources that may be utilized to implement at least a portion of the information processing system 100 in FIG. 1. The cloud infrastructure 1000 comprises multiple virtual machines (VMs) and/or container sets 1002-1, 1002-2, . . . 1002-L implemented using virtualization infrastructure 1004. The virtualization infrastructure 1004 runs on physical infrastructure 1005, and illustratively comprises one or more hypervisors and/or operating system level virtualization infrastructure. The operating system level virtualization infrastructure illustratively comprises kernel control groups of a Linux operating system or other type of operating system.

The cloud infrastructure 2300 further comprises sets of applications 1010-1, 1010-2, . . . 1010-L running on respective ones of the VMs/container sets 1002-1, 1002-2, . . . 1002-L under the control of the virtualization infrastructure 1004. The VMs/container sets 1002 may comprise respective VMs, respective sets of one or more containers, or respective sets of one or more containers running in VMs.

In some implementations of the FIG. 10 embodiment, the VMs/container sets 1002 comprise respective VMs implemented using virtualization infrastructure 1004 that comprises at least one hypervisor. A hypervisor platform may be used to implement a hypervisor within the virtualization infrastructure 1004, where the hypervisor platform has an associated virtual infrastructure management system. The underlying physical machines may comprise one or more distributed processing platforms that include one or more storage systems.

In other implementations of the FIG. 10 embodiment, the VMs/container sets 1002 comprise respective containers implemented using virtualization infrastructure 1004 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1000 shown in FIG. 10 may represent at least a portion of one processing platform. Another example of such a processing platform is processing platform 1100 shown in FIG. 11.

The processing platform 1100 in this embodiment comprises a portion of system 100 and includes a plurality of processing devices, denoted 1102-1, 1102-2, 1102-3, . . . 1102-K, which communicate with one another over a network 1104.

The network 1104 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1102-1 in the processing platform 1100 comprises a processor 1110 coupled to a memory 1112.

The processor 1110 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1112 may comprise random access memory (RAM), read-only memory (ROM), flash memory or other types of memory, in any combination. The memory 1112 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1102-1 is network interface circuitry 1114, which is used to interface the processing device with the network 1104 and other system components, and may comprise conventional transceivers.

The other processing devices 1102 of the processing platform 1100 are assumed to be configured in a manner similar to that shown for processing device 1102-1 in the figure.

Again, the particular processing platform 1100 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for cross-correlation of log patterns across IT assets based on log timeline generation as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured:
   to determine a set of two or more log patterns to utilize for scanning a set of logs associated with a cluster of two one or more information technology assets, a given one of the set of two or more log patterns comprising a mapping between (i) at least a portion of a given raw log entry and (ii) a given descriptive textual label representing content of the given raw log entry;
   to scan the set of logs associated with the cluster of two or more information technology assets to identify instances of the determined set of two or more log patterns;
   to generate a log timeline of the identified instances of the determined set of two or more log patterns; and
   to utilize the generated log timeline to cross-correlate the identified instances of the determined set of two or more log patterns for the cluster of two or more information technology assets, the generated log timeline consolidating a first set of events occurring on a first one of the two or more information technology assets in the cluster and a second set of events occurring on a second one of the two or more information technology assets in the cluster, the first set of events and the second set of events being associated with ones of the two or more log patterns in different ones of two or more functional areas of an information technology software stack running on the cluster of two or more information technology assets.

2. The apparatus of claim 1 wherein the first information technology asset has a defined relationship with the second information technology asset.

3. The apparatus of claim 2 wherein the defined relationship comprises a replication relationship.

4. The apparatus of claim 1 wherein the set of two or more log patterns is determined by parsing one or more tags, a given one of the one or more tags comprising at least two log patterns associated with a given event type.

5. The apparatus of claim 4 wherein the at least two log patterns in the given one of the one or more tags comprise:
   at least a first log pattern in a first one of the two or more functional areas of the information technology software stack running on the cluster of two or more information technology assets; and
   at least a second log pattern in a second one of the two or more functional areas of the information technology software stack running on the cluster of two or more information technology assets, the second functional area being different than the first functional area.

6. The apparatus of claim 1 wherein the set of two or more log patterns is determined by parsing two or more log pattern configuration files, and wherein the two or more log configuration pattern files are associated with different functional areas of the information technology software stack running on the cluster of two or more information technology assets.

7. The apparatus of claim 1 wherein the set of two or more log patterns is determined by parsing two or more tag configuration files, and wherein the two or more tag configuration files are associated with two or more different types of operations of the information technology software stack running on the cluster of two or more information technology assets.

8. The apparatus of claim 7 wherein a given one of the two or more different types of operations comprise a first set of one or more log patterns from a first functional area of the information technology software stack running on the cluster of two or more information technology assets and a second set of one or more log patterns from a second functional area of the information technology software stack running on the cluster of two or more information technology assets.

9. The apparatus of claim 1 wherein the given one of the set of two or more log patterns utilizes regular expression matching for mapping (i) said at least a portion of the given raw log entry to (ii) the given descriptive textual label representing the content of the given raw log entry.

10. The apparatus of claim 1 wherein the generated log timeline consolidates the first set of events occurring on the first information technology asset and the second set of events occurring on the second information technology asset into a single visualization.

11. The apparatus of claim 1 wherein the generated log timeline utilizes a tabular format with tabs corresponding to the two or more information technology assets and entries for different times having descriptive textual labels representing the content of raw log entries for events occurring on respective ones of the two or more information technology assets at the different times.

12. The apparatus of claim 1 wherein the at least one processing device is further configured to perform remediation of the diagnosed at least one issue encountered on said at least one of the two or more information technology assets.

13. The apparatus of claim 1 wherein the at least one processing device is further configured to diagnose at least one issue encountered on at least one of the two or more information technology assets utilizing the cross-correlated instances of the determined set of two or more log patterns.

14. A computer program product comprising a non-transitory processor-readable storage medium having stored therein program code of one or more software programs, wherein the program code when executed by at least one processing device causes the at least one processing device:

to determine a set of two or more log patterns to utilize for scanning a set of logs associated with a cluster of two or more information technology assets, a given one of the set of two or more log patterns comprising a mapping between (i) at least a portion of a given raw log entry and (ii) a given descriptive textual label representing content of the given raw log entry;

to scan the set of logs associated with the cluster of two or more information technology assets to identify instances of the determined set of two or more log patterns;

to generate a log timeline of the identified instances of the determined set of two or more log patterns; and to utilize the generated log timeline to cross-correlate the identified instances of the determined set of two or more log patterns for the cluster of two or more information technology assets, the generated log timeline consolidating a first set of events occurring on a first one of the two or more information technology assets in the cluster and a second set of events occurring on a second one of the two or more information technology assets in the cluster, the first set of events and the second set of events being associated with ones of the two or more log patterns in different ones of two or more functional areas of an information technology software stack running on the cluster of two or more information technology assets.

15. The computer program product of claim 14 wherein the set of two or more log patterns are determined by parsing two or more tag configuration files, and wherein the two or more tag configuration files are associated with two or more different types of operations of the information technology software stack running on the cluster of two or more information technology assets.

16. The computer program product of claim 14 wherein the generated log timeline utilizes a tabular format with tabs corresponding to the two or more information technology assets and entries for different times having descriptive textual labels representing the content of raw log entries for events occurring on respective ones of the two or more information technology assets at the different times.

17. A method comprising:

determining a set of two or more log patterns to utilize for scanning a set of logs associated with a cluster of two or more information technology assets, a given one of the set of two or more log patterns comprising a mapping between (i) at least a portion of a given raw log entry and (ii) a given descriptive textual label representing content of the given raw log entry;

scanning the set of logs associated with the cluster of two or more information technology assets to identify instances of the determined set of two or more log patterns;

generating a log timeline of the identified instances of the determined set of two or more log patterns; and utilizing the generated log timeline to cross-correlate the identified instances of the determined set of two or more log patterns for the cluster of two or more information technology assets, the generated log timeline consolidating a first set of events occurring on a first one of the two or more information technology assets in the cluster and a second set of events occurring on a second one of the two or more information technology assets in the cluster, the first set of events and the second set of events being associated with ones of the two or more log patterns in different ones of two or more functional areas of an information technology software stack running on the cluster of two or more information technology assets;

wherein the method is performed by at least one processing device comprising a processor coupled to a memory.

18. The method of claim 17 wherein the set of two or more log patterns are determined by parsing two or more tag configuration files, and wherein the two or more tag configuration files are associated with two or more different types of operations of the information technology software stack running on the cluster of two or more information technology assets.

19. The method of claim 17 wherein the generated log timeline utilizes a tabular format with tabs corresponding to the two or more information technology assets and entries for different times having descriptive textual labels representing the content of raw log entries for events occurring on respective ones of the two or more information technology assets at the different times.

20. The method of claim 17 wherein the first information technology asset has a replication relationship with the second information technology asset.

* * * * *